US012130074B2

(12) United States Patent
Li et al.

(10) Patent No.: US 12,130,074 B2
(45) Date of Patent: Oct. 29, 2024

(54) REFRIGERATOR AND DEDICATED REGION MODULE FOR REFRIGERATION APPARATUS

(71) Applicants: QINGDAO HAIER REFRIGERATOR CO., LTD., Qingdao (CN); HAIER SMART HOME CO., LTD., Qingdao (CN)

(72) Inventors: Xiaofeng Li, Qingdao (CN); Wenchun Wang, Qingdao (CN); Hao Zhang, Qingdao (CN); Enpin Xia, Qingdao (CN); Tong Xu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 0 days.

(21) Appl. No.: 17/767,913

(22) PCT Filed: Apr. 12, 2021

(86) PCT No.: PCT/CN2021/086433
§ 371 (c)(1),
(2) Date: Apr. 10, 2022

(87) PCT Pub. No.: WO2021/213198
PCT Pub. Date: Oct. 28, 2021

(65) Prior Publication Data
US 2024/0085096 A1 Mar. 14, 2024

(30) Foreign Application Priority Data
Apr. 20, 2020 (CN) .......................... 202010311769.0

(51) Int. Cl.
F25D 23/06 (2006.01)
F25D 23/02 (2006.01)
H02J 50/20 (2016.01)

(52) U.S. Cl.
CPC ......... *F25D 23/065* (2013.01); *F25D 23/028* (2013.01); *F25D 2400/40* (2013.01); *H02J 50/20* (2016.02)

(58) Field of Classification Search
CPC .. F25D 23/028; F25D 23/123; F25D 2323/02; F25D 2400/40; H02J 50/20
See application file for complete search history.

(56) References Cited

U.S. PATENT DOCUMENTS 9,790,721 B2 * 10/2017 Ueyama ................ F25D 23/028
10,429,126 B2 * 10/2019 Park ...................... G06F 3/0414
(Continued)

FOREIGN PATENT DOCUMENTS

CN 101867232 A 10/2010
CN 104578337 A 4/2015
(Continued)

*Primary Examiner* — Daniel J Rohrhoff
(74) *Attorney, Agent, or Firm* — Cheng-Ju Chiang (57) ABSTRACT

The present invention discloses a refrigerator and a dedicated region module for a refrigeration apparatus, the refrigerator including a cabinet and a door for opening or closing the cabinet, a dedicated region module being provided on an inner side of the door facing the cabinet, and the dedicated region module having a receiving space for storing articles, the dedicated region module includes the electric component and a power module for supplying power to the electric component, such that a whole structure is simpler, and a manufacturing process is simpler.

8 Claims, 7 Drawing Sheets

(56) References Cited

U.S. PATENT DOCUMENTS

| | | | |
|---|---|---|---|
| 10,684,065 B2 * | 6/2020 | Kim | F25D 23/025 |
| 2020/0072544 A1 * | 3/2020 | Lee | F25D 29/005 |
| 2020/0076223 A1 * | 3/2020 | Kuriki | H01M 10/44 |
| 2021/0055044 A1 * | 2/2021 | Kraemer | F25D 21/04 |
| 2021/0234718 A1 * | 7/2021 | Seo | H04L 12/282 |
| 2022/0299253 A1 * | 9/2022 | Fulgham, Jr. | F25D 29/00 |
| 2022/0373252 A1 * | 11/2022 | Bihr | F25D 29/005 |

FOREIGN PATENT DOCUMENTS

| | | |
|---|---|---|
| CN | 207035650 U | 2/2018 |
| CN | 108413698 A | 8/2018 |
| CN | 111457641 A | 7/2020 |
| CN | 212378321 U | 1/2021 |
| CN | 212778100 U | 3/2021 |
| KR | 20-2010-0005185 U | 5/2010 |

* cited by examiner

REFRIGERATOR AND DEDICATED REGION MODULE FOR REFRIGERATION APPARATUS

CROSS REFERENCE TO RELATED APPLICATIONS

The present invention is a 35 U.S.C. § 371 National Phase conversion of International (PCT) Patent Application No. PCT/CN2021/086433, filed on Apr. 12, 2021, which claims benefit of Chinese Application No. 202010311769.0, filed on Apr. 20, 2020, the disclosure of which is incorporated by reference herein. The PCT International Patent Application was filed and published in Chinese.

TECHNICAL FIELD

The present invention relates to a refrigerator and a dedicated region module for a refrigeration apparatus.

BACKGROUND

A refrigerator includes a cabinet and a door operatively opening/closing the cabinet, and in order to expand the storage space of the refrigerator, a dedicated storage region is usually provided on the door of the refrigerator. In order to expand more intelligent functions of the dedicated storage region, the dedicated storage region is provided with an electric component, a cable is required to be laid for power supply of the electric component, and the door is movable relative to the cabinet, such that the layout of the cable is complex, resulting in a more complex manufacturing process and a high cost.

SUMMARY

An object of the present invention is to provide a refrigerator and a dedicated region module for a refrigeration apparatus, and the dedicated region module for the refrigerator is provided with a power module for supplying power to an electric component, such that a whole structure is simpler, and a manufacturing process is simpler.

To achieve the above object, an embodiment of the present invention provides a refrigerator comprising a cabinet with a plurality of storage compartments and a door for opening or closing the cabinet, a dedicated region module being provided on an inner side of the door facing the cabinet, and the dedicated region module having a receiving space for storing articles, the dedicated region module comprises an electric component and a power module supplying power to the electric component.

As a further improvement of an embodiment of the present invention, the refrigerator further comprising a wireless charging unit, wherein the wireless charging unit comprises a receiving terminal provided on the dedicated region module and a transmitting terminal provided on the cabinet, the transmitting terminal is matched with the receiving terminal and configured to transmit generated energy, and the receiving terminal is electrically connected with the power module and controllably charges the power module.

As a further improvement of an embodiment of the present invention, the dedicated region module has an accommodating space for accommodating the receiving terminal and the power module, and the accommodating space is isolated from the receiving space.

As a further improvement of an embodiment of the present invention, the dedicated region module comprises a rear side portion opposite to the dedicated region door, a left side portion, a right side portion, an upper side portion, and a lower side portion, the left side portion, the right side portion, the upper side portion, and the lower side portion extend from the rear side portion to the dedicated region door, and the accommodating space and the receiving space are located on both sides of the upper side portion.

As a further improvement of an embodiment of the present invention, the dedicated region module further comprises a cover plate covering the accommodating space.

As a further improvement of an embodiment of the present invention, the dedicated region module comprises a rear side portion opposite to the dedicated region door, a left side portion, a right side portion, an upper side portion, and a lower side portion, the left side portion, the right side portion, the upper side portion, and the lower side portion extend from the rear side portion to the dedicated region door, and the accommodating space and the receiving space are located on both sides of the lower side portion.

As a further improvement of an embodiment of the present invention, the refrigerator further comprising a hinge device, wherein the door is rotatably connected to the cabinet by the hinge device, and the transmitting terminal is provided on the hinge device.

As a further improvement of an embodiment of the present invention, the hinge device comprises a hinge assembly and a hinge box covering the hinge assembly, and the transmitting terminal is provided to the hinge box.

To achieve the above object, the present invention also provides a dedicated region module for a refrigeration apparatus, the dedicated region module having a receiving space for storing articles, the dedicated region module comprises an electric component and a power module supplying power to the electric component.

As a further improvement of an embodiment of the present invention, the power supply module is configured as a rechargeable power source.

Compared with the prior art, the present invention has the beneficial effects as follows: the dedicated region module for the refrigerator is provided with the power module for supplying power to the electric component, and a cable is not required to be laid additionally, such that the whole structure is simpler, and the manufacturing process is simpler. In addition, the power module is configured as a rechargeable power source, which avoids replacement of the power module, thus further reducing a use cost.

DETAILED DESCRIPTION

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

In the description about the embodiments of the present invention, the orientation or positional relation indicated by terms such as "upper," "lower," "front," "rear," "left," "right," "vertical," "horizontal," "bottom," "inner," and "outer" should be construed to refer to the orientation or positional relation as shown in the drawings, or the mutual positional relation of components in the vertical, perpendicular or gravity direction, and the vertical direction refers to the upper and lower direction on the paper shown in the diagram; "inner and outer" generally refer to the interior and exterior of a chamber.

As shown in FIGS. 1 to 9, a first embodiment of the present invention provides a refrigerator which is preferably configured as a smart/intelligent home appliance. The refrigerator includes a cabinet 10 and a door 12 for opening or closing the cabinet 10, and a plurality of storage compartments may be arranged in the cabinet 10 at intervals as required. The refrigerator usually includes a refrigerating chamber and a freezing chamber which is not illustrated here. A dedicated region module 14 is provided on an inner side of the door 12 facing the cabinet 10, and the dedicated region module 14 is provided with a receiving space 16 for storing articles. When the door 12 is closed, the dedicated region module 14 is located in the storage compartment, and when the door 12 is opened, the dedicated region module 14 is moved out of the storage compartment as the door 12 is opened.

Figure 1:
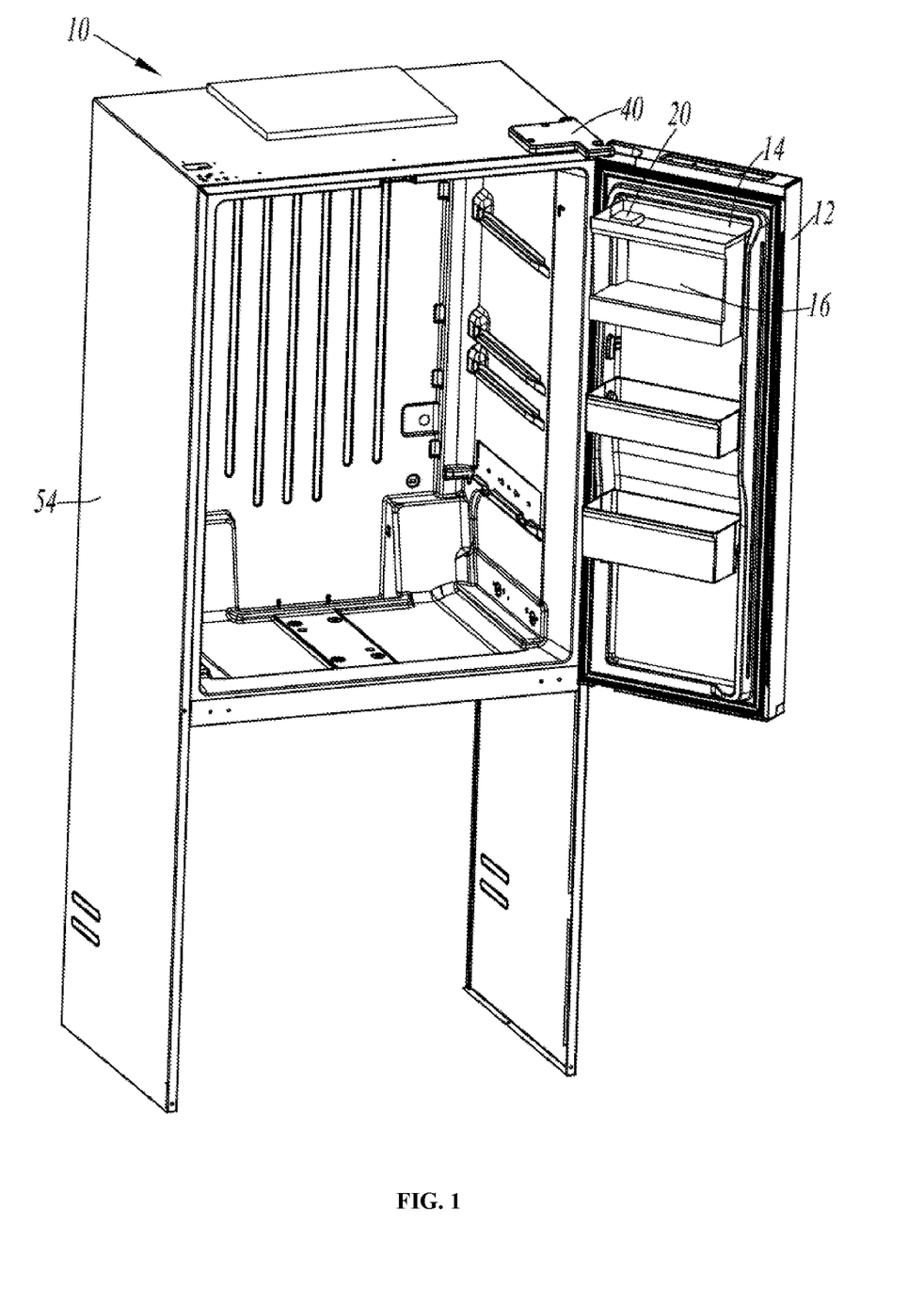
FIG. 1 is a schematic perspective diagram of a refrigerator according to a first embodiment of the present invention with a dedicated region door and a cover plate removed.
Figure 2:
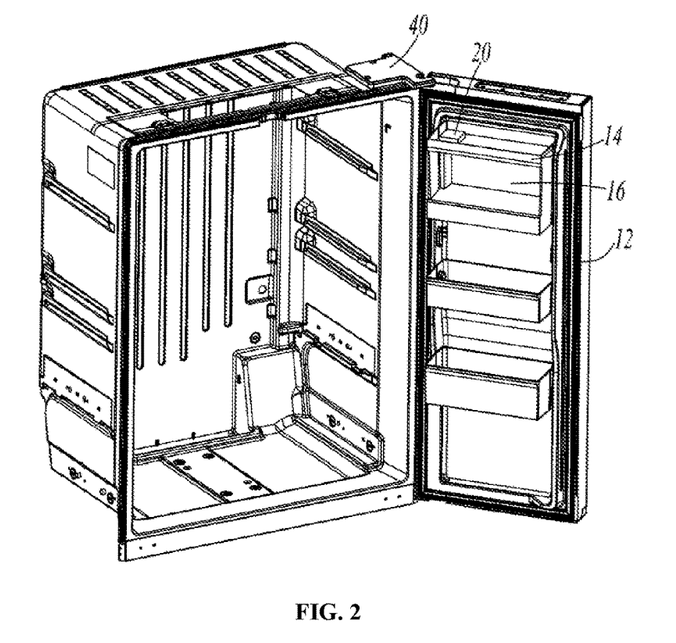
FIG. 2 is a schematic perspective diagram of the refrigerator in FIG. 1 with a U-shaped shell removed.
Figure 3:
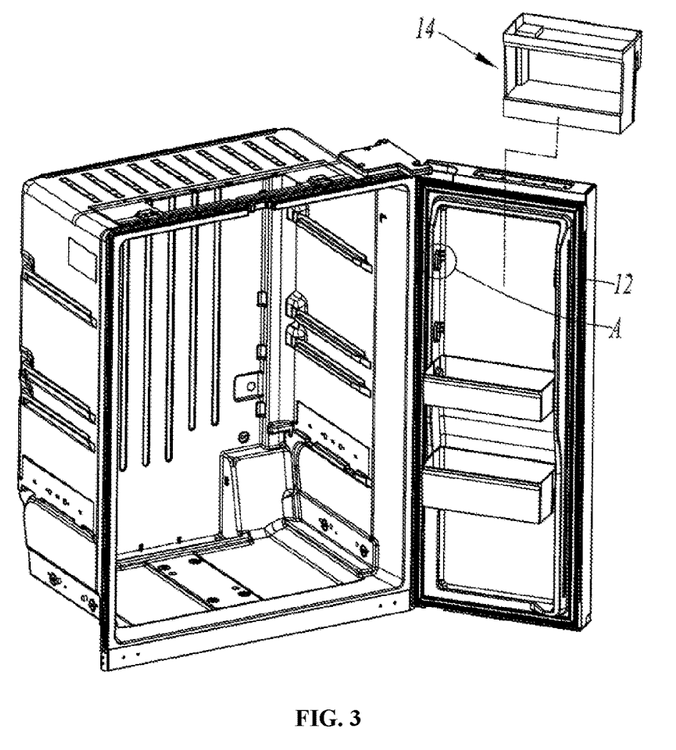
FIG. 3 is a schematic partial perspective exploded diagram of the refrigerator in FIG. 2.

Preferably, the dedicated region module 14 forms a sealed receiving space 16, and the temperature and humidity in the dedicated region module 14 may be independently controlled. Certainly, the receiving space 16 may not be completely sealed.

Figure 5:
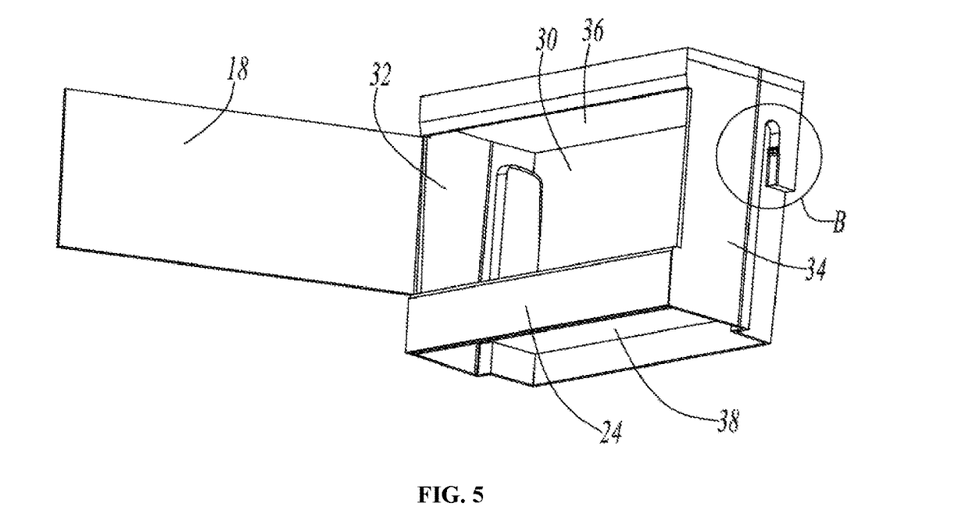
FIG. 5 is a schematic perspective diagram of a dedicated region module of the refrigerator in FIG. 1 with the dedicated region door in an opened state.

Further, the dedicated region module 14 further includes a dedicated region door 18 for opening/closing the receiving space 16. When the dedicated region door 18 is in a closed state, the dedicated region module 14 forms the sealed receiving space 16. The dedicated region door 18 is configured to be manually opened or closed. Certainly, the dedicated region door 18 may also be configured to be automatically opened or closed. In addition, the dedicated region module 14 may also be configured to include a drawer, and the drawer forms the receiving space and may be partially removed to take and place articles. Specifically, the drawer is configured to be slidably drawn or rotatably moved out or in.

Specifically, in the present embodiment, when the articles are placed in or taken out from the dedicated region module 14, the dedicated region door 18 is opened. After the articles are taken and placed, the dedicated region door 18 is closed. Preferably, the dedicated region module 14 is provided with a door lock for locking the dedicated region door 18 in the closed state, and the door lock has a mechanical locking structure or an electronic locking structure. In the preferred embodiment, the dedicated region door 18 is rotatably connected, and the axis of rotation of the dedicated region door 18 is substantially vertical.

Further, the refrigerator includes a wireless charging unit, the wireless charging unit includes a receiving terminal 20 provided on the dedicated region module 14 and a transmitting terminal 22 provided on the cabinet 10, the transmitting terminal 22 is matched with the receiving terminal 20 and configured to transmit generated energy, and the dedicated region module 14 further includes an electric component electrically connected with the receiving terminal 20. The transmitting terminal 22 is connected with city power to convert the city power into an electromagnetic wave signal and transmit the electromagnetic wave signal outwards, and the receiving terminal 20 receives the electromagnetic wave signal and converts the electromagnetic wave signal into electric energy. The electric component includes a touch display module 24, and the touch display module 24 is configured to display various kinds of data and control the entire dedicated region module 14 to perform other operations.

One or more than two electric components may be provided. For example, the electric component may include any one or any number of functional components and parts, such as a control circuit board, a motor, an air compressor, a semiconductor chiller, a heating wire, or the like. The electric component may be provided at same or different positions. The semiconductor chiller is configured to maintain a certain refrigerating temperature in the dedicated region module 14.

Further, a temperature sensor for detecting a temperature is provided in the dedicated region module 14, and is electrically connected with the touch display module 24, the semiconductor chiller and the control circuit board, such that the control circuit board performs an analysis and correspondingly controls the semiconductor chiller according to the temperature detected by the temperature sensor, thereby always keeping the temperature in the dedicated region module 14 within a temperature range meeting a preset requirement.

A humidity sensor for detecting humidity may also be provided in the dedicated region module 14, and is electrically connected with the touch display module 24, the heating wire and the control circuit board, such that the control circuit board performs an analysis and correspondingly controls the heating wire according to the humidity detected by the humidity sensor, thereby always keeping the humidity in the dedicated region module 14 within a humidity range meeting a preset requirement.

In the preferred embodiment, the receiving terminal 20 is provided on the dedicated region module 14, the transmitting terminal 22 is provided on the cabinet 10, the transmitting terminal 22 is wirelessly matched with the receiving terminal 20 and supplies power to the receiving terminal 20, the receiving terminal 20 then supplies power to the electric component on the dedicated region module 14, and a cable is not required to be laid additionally, such that a whole structure is simpler, and a manufacturing process is simpler.

The receiving terminal 20 is located outside the receiving space 16. Certainly, the receiving terminal 20 may also be provided in the receiving space 16. Specifically, the distance between the transmitting terminal 22 and the receiving terminal 20 is less than the wireless transmission distance, thereby guaranteeing effective radio transmission between the transmitting terminal 22 and the receiving terminal 20.

The dedicated region module 14 has an accommodating space for accommodating the receiving terminal 20, and the accommodating space is isolated from the receiving space 16. The dedicated region module 14 further includes a cover plate 28 covering the accommodating space. As such, the receiving terminal 20 is sealed in the accommodating space, such that people may not touch the receiving terminal 20, resulting in a safer effect. Certainly, the receiving terminal 20 may be directly provided outside the receiving space 16 without providing the cover plate 28 or the accommodating space. The cover plate 28 may be detachably connected to the dedicated region module 14 by fasteners, such as screws. At this point, when the accommodating space is to be opened, the cover plate 28 is required to be completely removed; that is, the cover plate 28 is completely separated from the dedicated region module 14. Certainly, the cover plate 28 may also be configured to be operationally rotatably provided at the dedicated region module 14, and when the accommodating space is required to be opened, only the cover plate 28 is required to be rotated, and the cover plate 28 is not separated from the dedicated region module 14.

The dedicated region module 14 includes a rear side portion 30 opposite to the dedicated region door 18, a left side portion 32, a right side portion 34, an upper side portion 36, and a lower side portion 38, the left side portion 32, the right side portion 34, the upper side portion 36, and the lower side portion 38 extend from the rear side portion 30 to the dedicated region door 18, and the accommodating space and the receiving space 16 are located on both sides of the upper side portion 36; that is, the accommodating space serves as an upper accommodating space. In addition, a lower accommodating space may be provided below the lower side portion 38; that is, the accommodating space and the receiving space 16 are located on both sides of the lower side portion 38. Further, the accommodating space may be provided behind the rear side portion 30. Similarly, the lower accommodating space and the rear accommodating space may also be provided with cover plates respectively. For the terms "upper, lower, front and rear" here, reference is made to a normal use state of the refrigerator, a side of the dedicated region module 14 provided with the dedicated region door 18 serves as a front side, and a side opposite to the dedicated region door 18 serves as a rear side. That is, the receiving terminal 20 may be provided in the upper accommodating space (see FIGS. 1, 2, 3 and 8) or the lower accommodating space (see FIG. 9).

Figure 9:
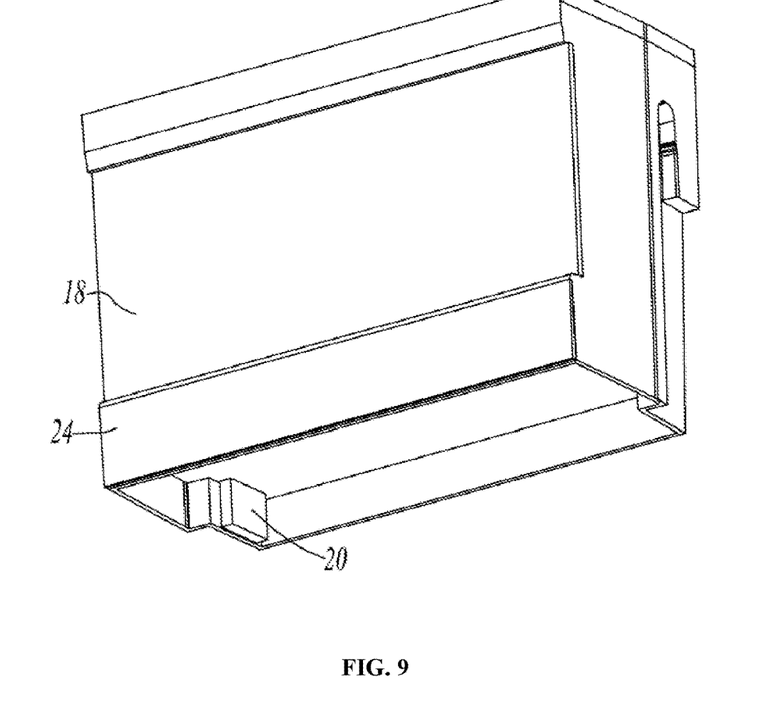
FIG. 9 is a schematic perspective diagram of the dedicated region module in FIG. 5 with the dedicated region door in a closed state and the transmitting terminal located in an accommodating space on a lower side.

The upper accommodating space is formed by extending a lateral side of the upper side portion 36 upwards, and the lower accommodating space is formed by extending a lateral side of the lower side portion 38. Thus, the dedicated region module 14 has a simple overall structure and a more regular overall appearance.

The refrigerator further includes a control unit, the control unit is provided between the receiving terminal 20 and the electric component, and the control unit is electrically connected with the receiving terminal 20 and the electric component. The control unit is configured to process a signal transmitted from the receiving terminal 20 or perform voltage conversion on the electric energy transmitted from the receiving terminal 20. Specifically, the control unit is provided in the accommodating space. Preferably, the control unit and the receiving terminal 20 are provided in the same accommodating space on a same side of the dedicated region module 14.

The refrigerator further includes a detector for detecting a position of the door 12, the detector is electrically connected with the control unit, the control unit receives and analyzes a signal of the position of the door 12 detected by the detector, and when the door 12 is detected to be opened, the control unit controls the wireless charging unit to supply power to the electric component. Specifically, as long as a door opening angle is greater than 0 degrees, the wireless charging unit starts to work to provide electric energy for the electric component. Further, when the detector detects that the door 12 is completely closed, the control unit controls the wireless charging unit to stop working, so as to stop supplying electric energy to the electric component.

Figure 7:
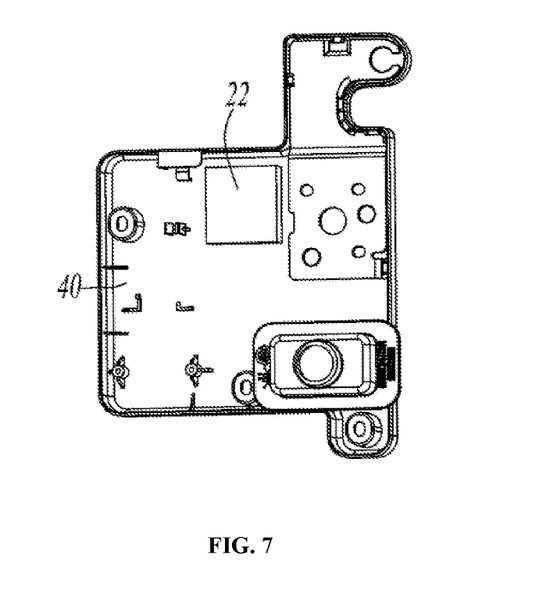
FIG. 7 is a schematic diagram of a hinge box and a transmitting terminal of the refrigerator in FIG. 2.
Figure 8:
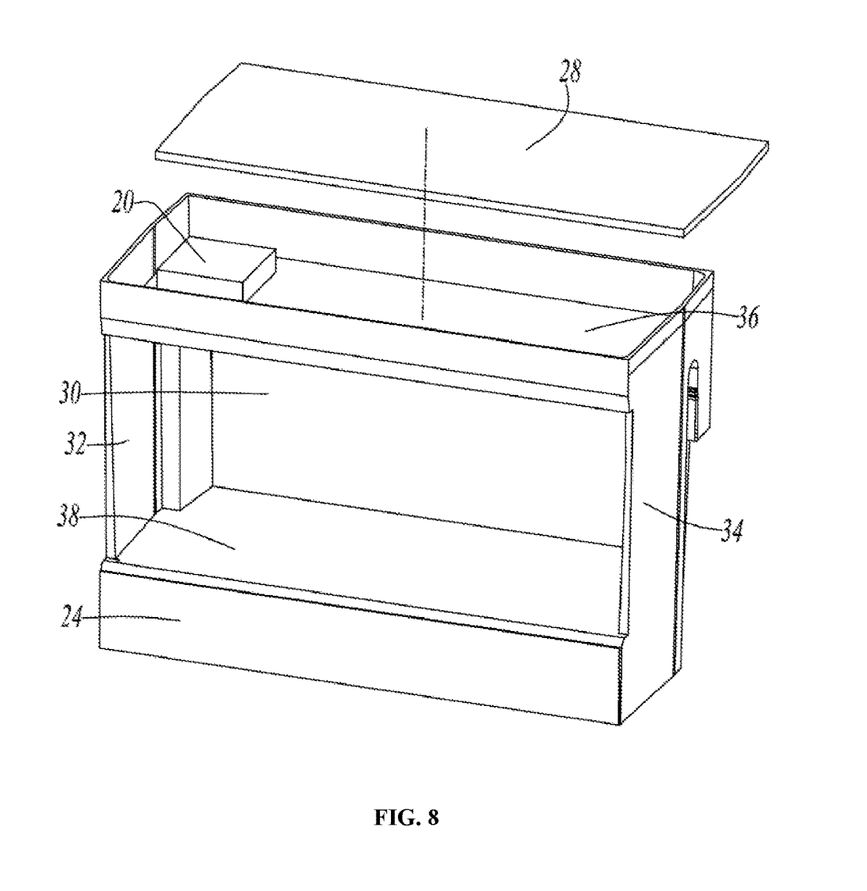
FIG. 8 is a schematic perspective exploded diagram of the dedicated region module in FIG. 5 with the dedicated region door removed.

The refrigerator further includes a hinge device, the door 12 is rotatably connected to the cabinet 10 by the hinge device, and the transmitting terminal 22 is provided at the hinge device. The hinge device includes a hinge assembly and a hinge box 40 covering the hinge assembly, and the transmitting terminal 22 is provided at the hinge box 40. Specifically, in the present embodiment, the transmitting terminal 22 is provided on an inner side of the hinge box 40. Certainly, the transmitting terminal 22 may be provided on an outer side surface of the hinge box 40. The arrangement of the transmitting terminal 22 on the hinge box 40 further facilitates a layout of a cable between the city power and the transmitting terminal 22. The city power is led from the cabinet 10 to the transmitting terminal 22.

Figure 4:
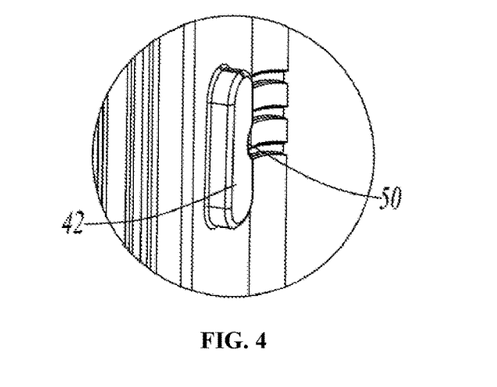
FIG. 4 is a schematic partial enlarged diagram at A in FIG. 3.
Figure 6:
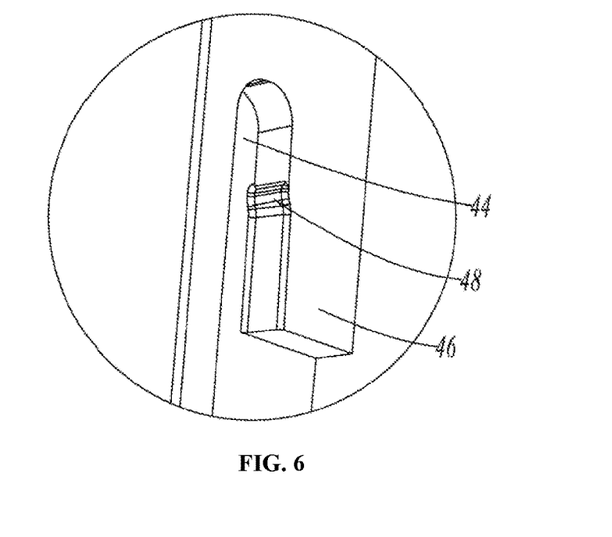
FIG. 6 is a schematic partial enlarged diagram at B in FIG. 5.

The dedicated region module 14 is detachably provided on the door 12, and the dedicated region module 14 is hung on the door 12. The dedicated region module 14 may be removed or mounted to the door 12 by hands without tools. A disassembly direction of the dedicated region module 14 is a vertical direction. The door 12 is provided with a supporting protrusion 42, and the dedicated region module 14 is provided with a fitting groove 44 fitted with the supporting protrusion 42. The fitting groove 44 has a downward opening; when the dedicated region module 14 is mounted, the dedicated region module 14 is first moved to approach the inner side of the door 12, and is then moved downwards, such that the fitting groove 44 is fitted with the supporting protrusion 42, and the dedicated region module 14 is moved downwards until the supporting protrusion 42 abuts against a bottom of the fitting groove 44. A side of the fitting groove 44 close to the door 12 serves as a stop edge 46, the stop edge 46 extends downwards by a certain distance, and the stop edge 46 is apart from the lower side portion 38, such that the stop edge 46 limits movement of the dedicated region module 14 away from the door 12. When detached, the dedicated region module 14 is first moved upwards until the fitting groove 44 is separated from the supporting protrusion 42; that is, the stop edge 46 no longer abuts against the supporting protrusion 42, such that the movement of the dedicated region module 14 away from the door 12 is no longer limited, and at this point, the dedicated region module 14 may be moved away from the door 12, thereby removing the dedicated region module 14. Therefore, the dedicated region module 14 is very convenient to disassemble and assemble.

In order to more stably mount the dedicated region module 14 on the door 12, one of lateral sides of the supporting protrusion 42 and the fitting groove 44 is provided with a positioning protrusion 48, and the other of the lateral sides of the supporting protrusion 42 and the fitting groove 44 is provided with a positioning groove 50 fitted with the positioning protrusion 48. Specifically, in the present embodiment, the positioning protrusion 48 is provided on the stop edge 46 on one side of the fitting groove, and the positioning groove 50 is provided on the supporting protrusion 42.

Figure 10:
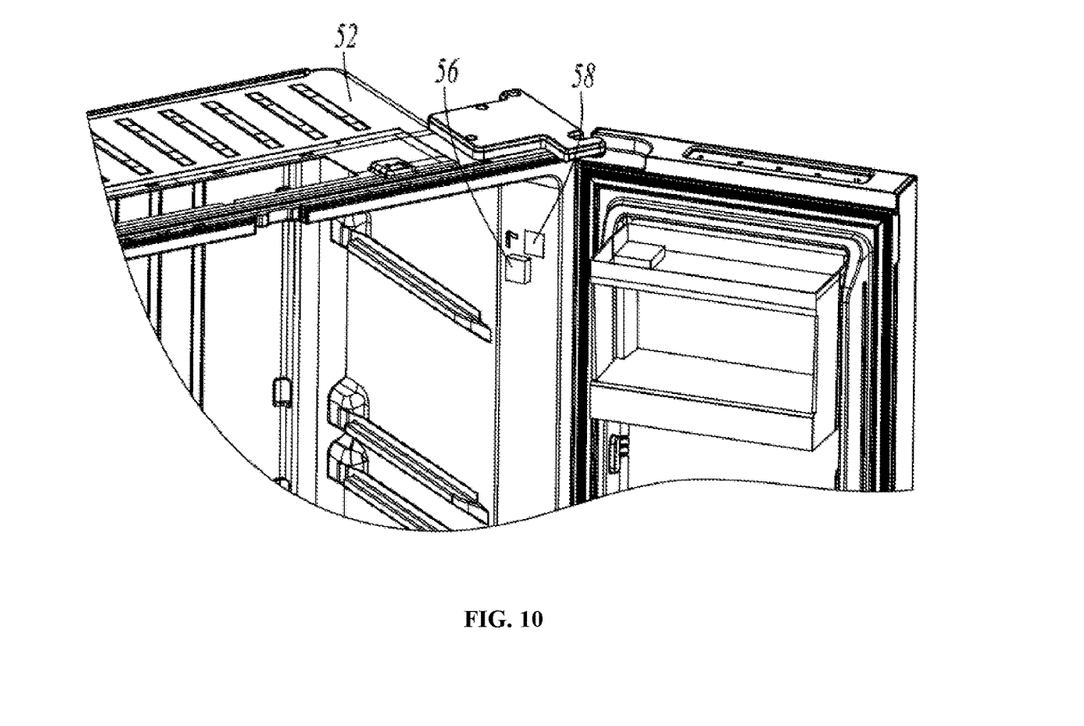
FIG. 10 is a schematic partial perspective diagram of a refrigerator according to a second embodiment of the present invention.

FIG. 10 shows a second embodiment of the present invention which is different from the first embodiment in that the arrangement position of the transmitting terminal is different. The transmitting terminal may be provided at other positions of the cabinet. Specifically, the cabinet has a liner 52, a U-shaped shell 54 (see FIG. 1), and a foaming space between the liner 52 and the U-shaped shell 54. The transmitting terminal 56 may be provided inside the liner, and specifically, the transmitting terminal 56 may be fixedly glued inside the liner; in addition, a pre-embedded box may be provided, the transmitting terminal 56 is provided in the pre-embedded box, and the pre-embedded box is then fixed inside the liner 52. Further, a mounting hole 58 is provided in the liner 52, and a wiring hole is reserved in the mounting hole 58, such that a cable connected with the transmitting terminal 56 conveniently extends out of the cabinet to be electrically connected with the transmitting terminal 54. The transmitting terminal 56 is fixed in the mounting hole 58 after the cabinet is foamed.

Figure 11:
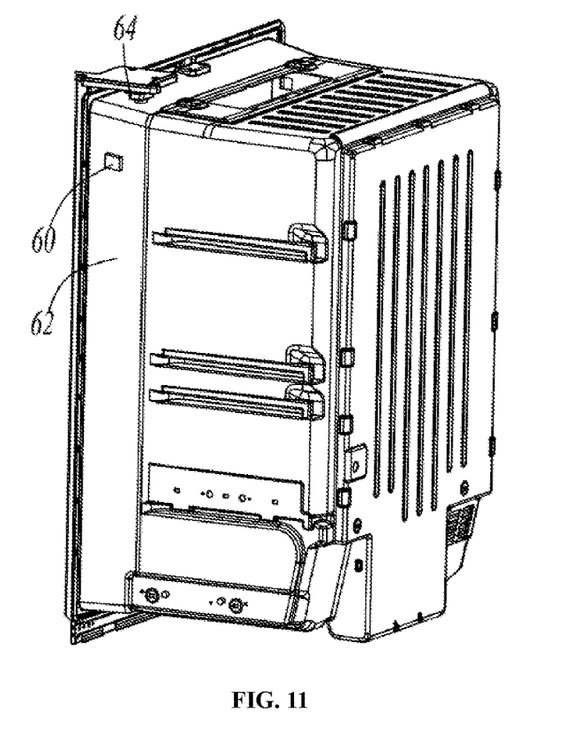
FIG. 11 is a schematic perspective diagram of a refrigerator according to a third embodiment of the present invention.

FIG. 11 shows a third embodiment of the present invention which is different from the first embodiment in that the arrangement position of the transmitting terminal is different. In the present embodiment, the transmitting terminal 60 may be provided on the U-shaped shell 54 or in the foaming space between the liner 62 and the U-shaped shell 54 (see FIG. 1). In order to allow the transmitting terminal 60 to be closer to the receiving terminal when the door is opened, the transmitting terminal 60 is provided on a rotating side close to the door (i.e., a side where the hinge device 64 is provided).

In addition, in the above embodiments, the transmitting terminals may be electrically connected to main power of the cabinet, and the transmitting terminal may also receive power from other assemblies, such as one of a freshness keeping drawer, a rack, an egg tray and a wine rack.

Figure 12:
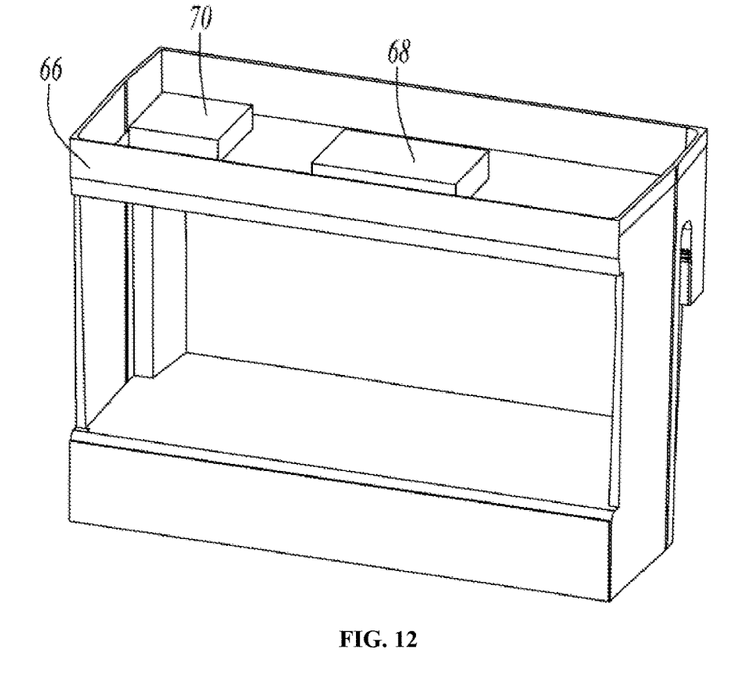
FIG. 12 is a schematic perspective diagram of a dedicated region module of a refrigerator according to a fourth embodiment of the present invention.

FIG. 12 shows a fourth embodiment of the present invention which is different from the first embodiment in that a power module 68 is provided at the dedicated region module 66.

The dedicated region module 66 includes the power module 68 providing power for the electric component. The power module 68 is configured as a rechargeable power source. The power module 68 may be charged wirelessly. Specifically, the refrigerator further includes a wireless charging unit, the wireless charging unit includes a receiving terminal 70 provided on the dedicated region module 66 and a transmitting terminal provided on the cabinet, the transmitting terminal is matched with the receiving terminal 70 and configured to transmit generated energy, and the receiving terminal 70 is electrically connected with the power module 68 and controllably charges the power module 68. The arrangement of the wireless charging unit is same as the arrangement in the first embodiment and is not repeated.

For a convenient connection, the dedicated region module 66 has an accommodating space, the receiving terminal 70 and the power module 68 are both provided in the accommodating space, and the accommodating space is isolated from a receiving space. The arrangement of the accommodating space is same as the arrangement in the first embodiment, and the accommodating space may be provided above the dedicated region module 66, or below or behind the dedicated region module 66. Specifically, in the present embodiment, the receiving terminal 70 and the power module 68 are both provided in the upper accommodating space.

The arrangement position of the transmitting terminal may be same as the arrangement position in the first, second or third embodiment, and the transmitting terminal may be provided on the hinge device, or other positions on the cabinet.

Further, the refrigerator further includes a door closing sensor, the door closing sensor is electrically connected with the control unit, the control unit receives and analyzes a door position signal sensed by the door closing sensor, and when the door is sensed to be closed, the control unit controls the wireless charging unit to charge the power module 68. When the power module 68 is fully charged, the control unit controls the wireless charging unit to stop charging. When the door closing sensor senses that the door is opened, the control unit controls the wireless charging unit to stop charging the power module 68, and meanwhile, the power module 68 supplies power to the electric component. When the door is closed, the receiving terminal 70 is close to the transmitting terminal, and the distance between the receiving terminal 70 and the transmitting terminal is kept unchanged relatively, such that the wireless charging operation between the transmitting terminal and the receiving terminal 70 is more stable and effective. When the door is opened, the power module 68 directly supplies power to the electric component. The power module 68 and the receiving terminal 70 may both be provided above or below or behind the dedicated region module 66. Similarly, the power module 68 and the receiving terminal 70 may be provided on different sides of the dedicated region module 66 respectively.

Figure 13:
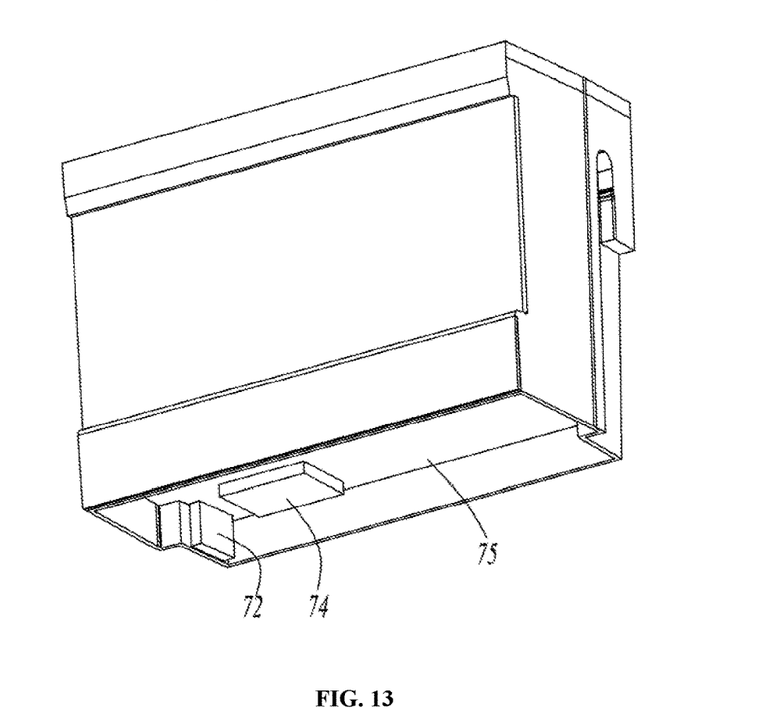
FIG. 13 is a schematic perspective diagram of a dedicated region module of a refrigerator according to a fifth embodiment of the present invention.

FIG. 13 shows a fifth embodiment of the present invention which is different from the fourth embodiment in that both the receiving terminal 72 and the power module 74 are provided in the lower accommodating space 75. The arrangement position of the transmitting terminal may be same as or different from the arrangement position in the fourth embodiment.

Figure 14:
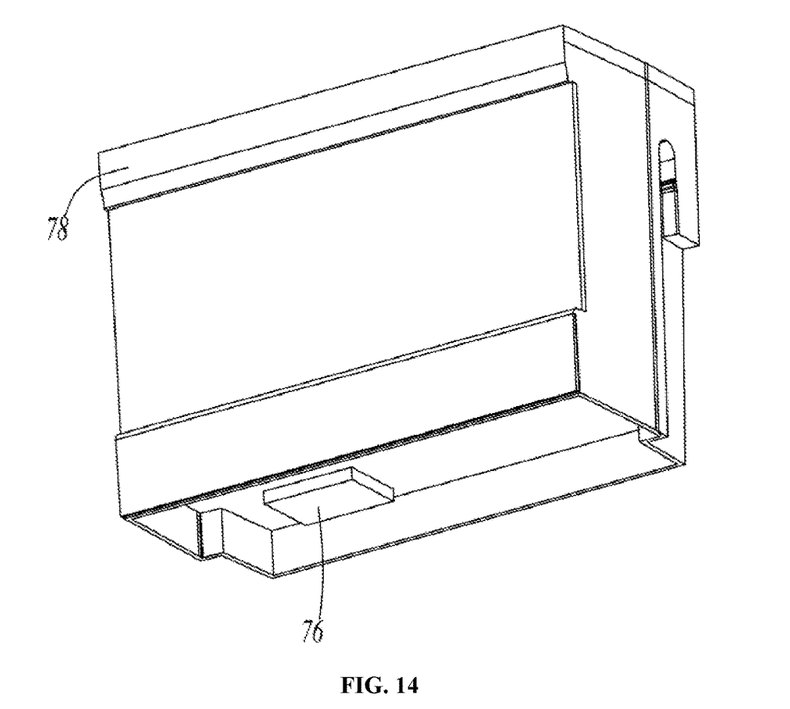
FIG. 14 is a schematic perspective diagram of a dedicated region module of a refrigerator according to a sixth embodiment of the present invention.

FIG. 14 shows a sixth embodiment of the present invention which is different from the fifth embodiment in that the wireless charging unit is not provided, the power module 76 is detachably provided, and when the power module 76 is short of power, the power module 76 may be detached to be charged in an environment other than the refrigerator. When the power module 76 is fully charged, the power module 76 is remounted on the dedicated region module 78. Certainly, the entire dedicated region module 78 with the power module 76 may be detached from the door of the refrigerator, and the power module 76 may be charged in an environment other than the refrigerator. When the power module 76 is fully charged, the entire dedicated region module with the power module 76 is remounted on the door.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

A series of the detailed descriptions set forth above is merely specific description of feasible embodiments of the present invention, and is not intended to limit the protection scope of the present invention. Equivalent embodiments or modifications made within the spirit of the present invention shall fall within the protection scope of the present invention.

What is claimed is:

1. A refrigerator, comprising a cabinet with a plurality of storage compartments and a door for opening or closing the cabinet, and a wireless charging unit, a dedicated region module being provided on an inner side of the door facing the cabinet, and the dedicated region module having a receiving space for storing articles, wherein the dedicated region module comprises an electric component and a power module supplying power to the electric component;

wherein the wireless charging unit comprises a receiving terminal provided on the dedicated region module and a transmitting terminal provided on the cabinet, the transmitting terminal is matched with the receiving terminal and configured to transmit generated energy, and the receiving terminal is electrically connected with the power module and controllably charges the power module.

2. The refrigerator according to claim 1, wherein the dedicated region module has an accommodating space for accommodating the receiving terminal and the power module, and the accommodating space is isolated from the receiving space.

3. The refrigerator according to claim 2, wherein the dedicated region module comprises a rear side portion opposite to the dedicated region door, a left side portion, a right side portion, an upper side portion, and a lower side portion, the left side portion, the right side portion, the upper side portion, and the lower side portion extend from the rear side portion to the dedicated region door, and the accommodating space and the receiving space are located on both sides of the upper side portion.

4. The refrigerator according to claim 2, wherein the dedicated region module further comprises a cover plate covering the accommodating space.

5. The refrigerator according to claim 2, wherein the dedicated region module comprises a rear side portion opposite to the dedicated region door, a left side portion, a right side portion, an upper side portion, and a lower side portion, the left side portion, the right side portion, the upper side portion, and the lower side portion extend from the rear side portion to the dedicated region door, and the accommodating space and the receiving space are located on both sides of the lower side portion.

6. The refrigerator according to claim 1, further comprising a hinge device, wherein the door is rotatably connected to the cabinet by the hinge device, and the transmitting terminal is provided on the hinge device.

7. The refrigerator according to claim 6, wherein the hinge device comprises a hinge assembly and a hinge box covering the hinge assembly, and the transmitting terminal is provided to the hinge box.

8. The refrigerator according to claim 1, wherein the power supply module is configured as a rechargeable power source.

* * * * *